Patented July 10, 1951

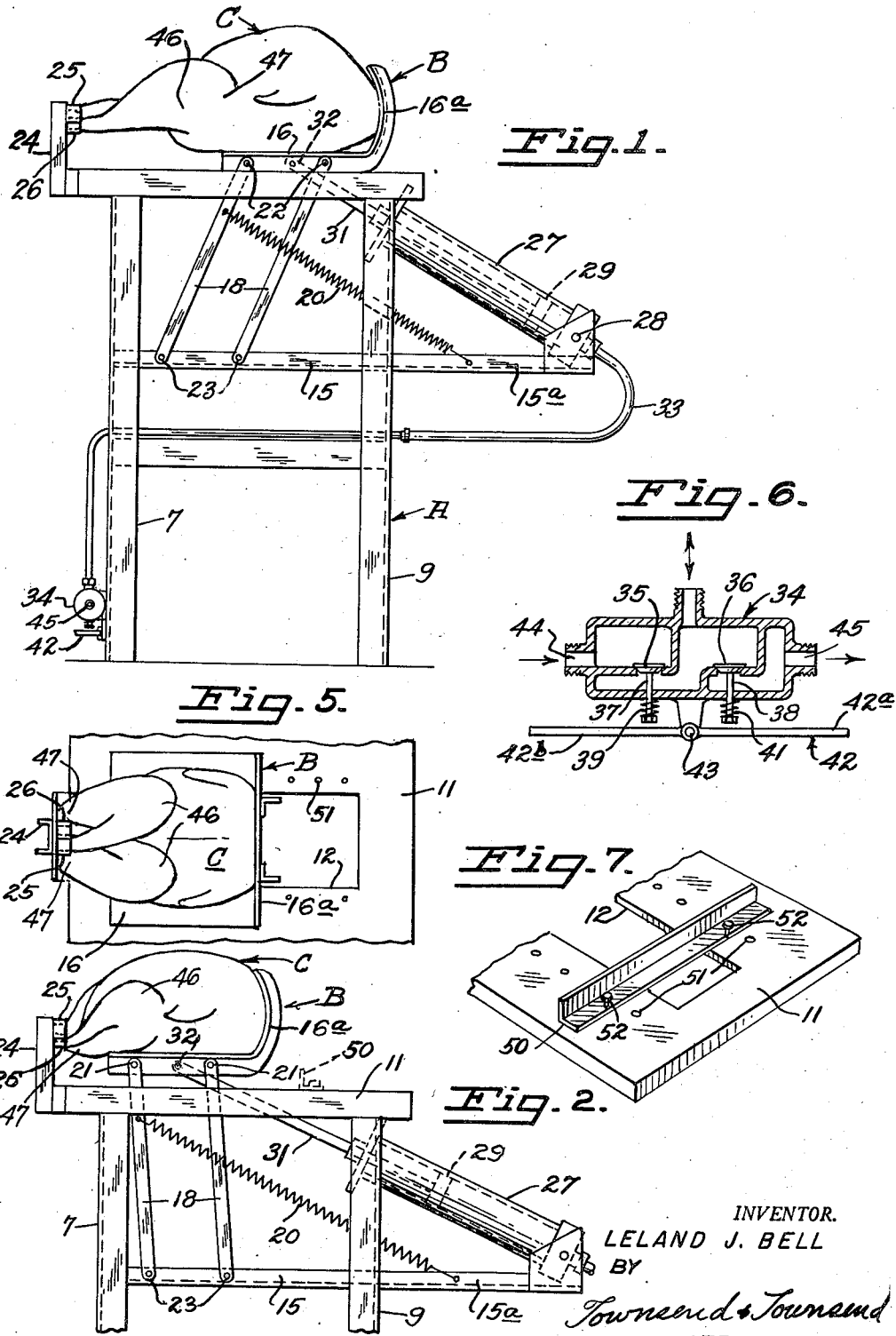

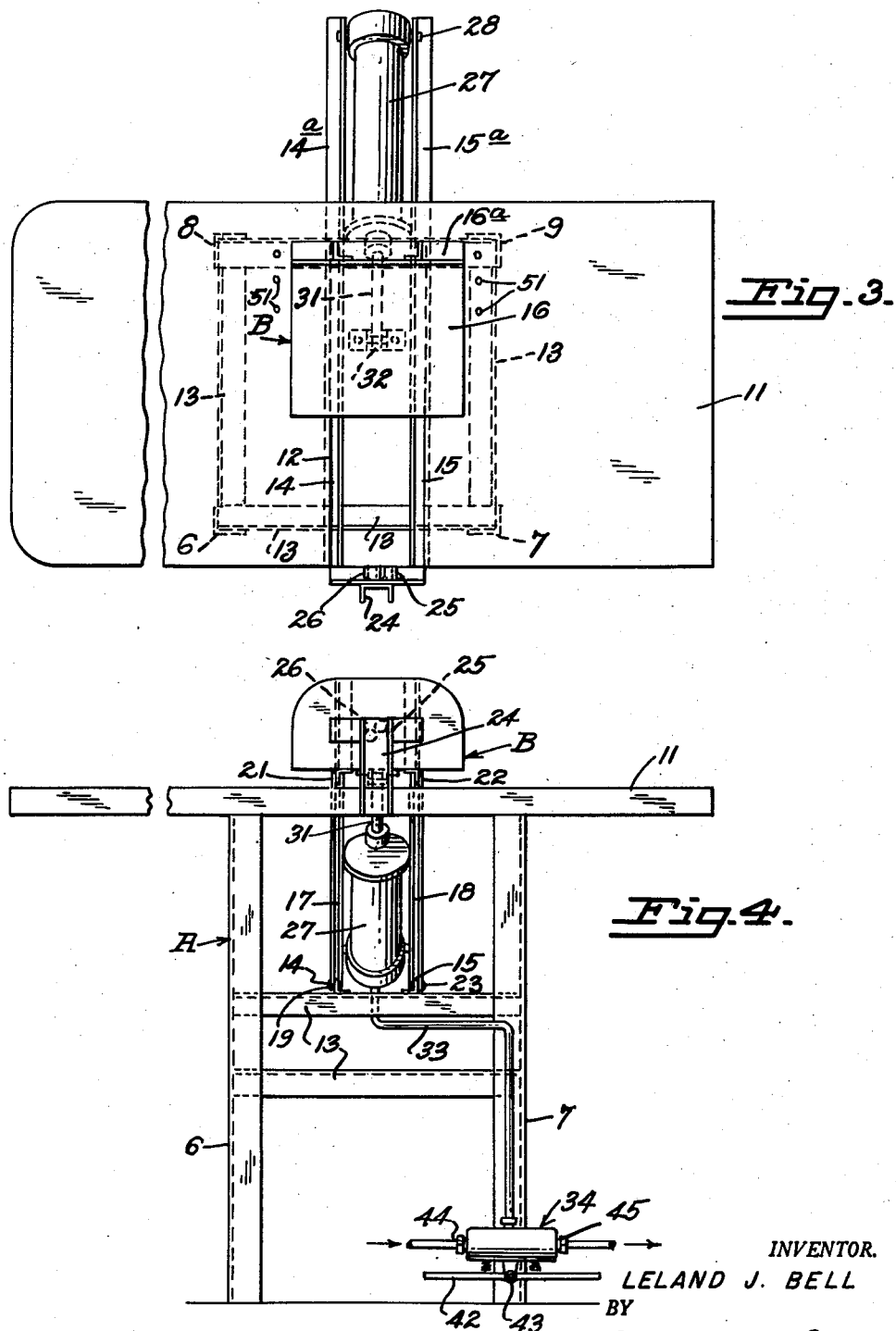

2,560,067

UNITED STATES PATENT OFFICE 2,560,067

DEVICE FOR FOLDING THE LEGS OF AN EVISCERATED BIRD

Leland J. Bell, North Sacramento, Calif.

Application June 25, 1949, Serial No. 101,362

10 Claims. (Cl. 17—11)

This invention relates to a bird handling device and more particularly relates to a machine for folding the legs of an eviscerated bird in hunched position against the ventral part of the carcass of said bird.

The particular embodiment of my invention which is illustrated in the drawings and which will hereinafter be described in greater detail comprises, generally, carrier to support the carcass of an eviscerated bird, and leg engaging members or sockets to receive the ends of the bird's legs which have been truncated or chopped off adjacent the hock joints thereof. The carrier is mounted relatively movable toward and away from the said leg engaging members, and means are provided to move the carrier with a bird supported thereon toward the leg engaging members in such manner that the legs of the bird are caused to bend at the thigh and stifle joints thereof and to fold in hunched positions against the ventral part of the carcass of the bird.

It is customary practice in plants where birds and more particularly fowls, such as turkeys, chickens, or the like, are eviscerated and processed for packaging and refrigeration to suspend the birds by their legs from an overhead trackway or endless belt to transport them from one part of the plant to another. As a result of such practice the legs of the birds stiffen, through rigor mortis, at the joints while the said legs are in a rearwardly extended position. It, therefore, becomes necessary for plant personnel to manually bend each bird's legs at their thigh and stifle joints in order to fold the legs of the birds against the carcass thereof, and to tie the ends of the legs to one another and to the posterior body portion of the bird in order to securely maintain the said legs in a desired folded position. Not only does this practice require very considerable human effort and physical strength on the part of operators but is a slow and tedious operation.

The principal object of the present invention, therefore, is to provide a device of the character above indicated which is especially suited for folding the legs of an eviscerated bird against the carcass of said bird. It is contemplated that the present invention will have particular use in the dressing of turkeys prior to the packaging and refrigeration of these fowls.

Other objects of the present invention are to provide a device having the desired characteristics above indicated which is relatively inexpensive to manufacture and which is extremely simple to install and operate.

Further objects of the present invention will become apparent upon reading the following specification and referring to the accompanying drawings in which similar characters of reference represent corresponding parts in each of the several views.

In the drawings:

Fig. 1 is a view in side elevation of the present invention showing the carrier in its retracted position.

Fig. 2 is a side elevational view of the invention showing the position of the carrier near the end of a compression stroke.

Fig. 3 is a top plan view of the invention showing the table part thereof partly broken away.

Fig. 4 is an end elevational view of the same.

Fig. 5 is a fragmentary top plan view of the invention.

Fig. 6 is a sectional view of the air actuating valve.

Fig. 7 is a fragmentary perspective view of the table and showing a preferred means for adjustably limiting the maximum length of reciprocable stroke of the carrier.

Referring now more particularly to the drawings, the present invention comprises a supporting frame, indicated generally at A, which more specifically includes four identically formed supporting legs comprising angle beams indicated at 6, 7, 8 and 9, and a flat table surface 11 which is provided with an elongated substantially centrally located slot 12. A plurality of strengthening braces or members comprising angle beams indicated at 13, connect the various legs together at points therealong located well below the table surface 11 to provide rigidity to the frame A.

A pair of spaced parallel angle irons 14 and 15 are rigidly attached to the top of an oppositely disposed pair of brace members 13. The distance separating the angle irons 14 and 15 is preferably approximately equal the span of slot 12 provided in the table surface 11. The said members 14 and 15 extend in the direction of the slot 12, and the ends 14a and 15a thereof project outwardly beyond and to the rear of frame A.

A carrier, indicated generally at B, comprises more specifically a flat tray or platform portion 16, and an upwardly extending pressure plate 16a. The carrier is supported movably with respect to the frame A by two pairs of identically formed arms 17 and 18. More specifically, the bottom ends of the arms comprising the pair 17 are attached pivotally, as indicated at 19, to angle iron 15, and the upper ends of each of these arms extend upwardly through slot 12 of the table member and are attached pivotally, as indicated at 21 to a side of carrier B. Similarly, the respective bottom ends of the arms comprising the pair 18 are attached, as at 22, to angle iron 14 and to the other side of carrier B as indicated at 23. It is noted that the longitudinal axes of all of the arms 17 and 18 are disposed parallel with respect to one another, and this arrangement of parts serves as a means for supporting carrier B for reciprocable movement in a direction toward and away from the leg engaging members which will hereinafter be identified more specifically. A suitable expansion spring 20 having its opposite ends attached respectively to an arm 17 and to member 15 of the frame is preferably provided to maintain the carrier in its retracted position as indicated in Fig. 1.

End piece 24 is attached rigidly to an edge of table surface B and projects upwardly therefrom to function as a rigid support for a pair of leg engaging members or sockets 25 and 26. The sockets 25 and 26 are located laterally with respect to one another, and socket 25 is disposed slightly above socket 26 for reasons which will appear hereinafter.

A pneumatically actuated cylinder 27 is supported pivotally adjacent its lower ends by a pin 28 which, in turn, extends between the rearwardly projecting ends 14a and 15a of angle irons 14 and 15. A piston 29 is slidably mounted within the cylinder, and its associated piston rod 31 extends upwardly through slot 12 and is pivotally attached, as at 32, to the bottom of carrier B. An airline 33 is provided to establish air communication between cylinder 27 and a three-way air valve, indicated generally at 34, which in turn is illustrated in more specific detail in Fig. 6.

More specifically air valve 34 comprises valve elements 35 and 36 having associated valve stems 37 and 38, respectively. Valve springs 39 and 41 are arranged to normally bias respectively valve stems 37 and 38 downwardly whereby their associated valve elements 35 and 36 are normally tightly seated in their respective valve seats. A foot pedal or valve actuating arm 42 having ends 42a and 42b is pivotally attached to frame A by a pin 43 and is adapted to permit an operator to actuate selectively either the valve element 35 or valve element 36 in a manner shortly to be described. A suitable source of compressed air (not shown) communicates with air inlet orifice 44, and provided in the opposite end of valve 34 is an exhaust port 45. Air communication between the compressed air source and the airline 33 may be controlled through actuation of valve element 35, and control of air communication between airline 33 and exhaust port 45 is controllable through operation of valve element 36.

In operation an eviscerated bird indicated generally at C such as a turkey, chicken or the like, which has had its legs chopped off approximately at the hock joints thereof, is placed with its back or dorsal side resting upon tray portion 16 of carrier B. The bird is positioned so that its neck (preferably with head removed) contacts pressure plate 17 of the carrier. Assuming a bird to have been thus positioned on the carrier the rearwardly extending stiffened legs of the fowl will project toward the leg engaging members 25 and 26. To institute movement of carrier B toward the leg engaging members an operator need only press with his foot downwardly upon end 42a of valve actuating arm 42 to cause the latter to pivot about pin 43. This latter movement will, in turn, cause end 42b of the arm to engage valve stem 37 and unseat valve element 35 to open communication between the compressed air source (not shown) and airline 33 communicating with cylinder 27. Compressed air entering cylinder 27 drives piston 29 carrying rod 31 in a direction appropriate to move carrier B in a direction toward the leg engaging members 24. More specifically, movement of carrier B is along a slightly arcuate path because of its pivoted support by pairs of arms 17 and 18. However, the carrier may also be considered as moving reciprocally toward and away from the leg engaging members. The pivot pin 28 permits the cylinder to follow the movement of the carrier.

When the carrier has moved sufficiently far toward the leg engaging sockets to bring the legs of a bird near the said sockets, the ends of the truncated legs may be crossed and inserted or guided into the sockets, such as indicated in Fig. 5 in the drawings. After the crossed legs of the bird have been inserted in the leg engaging sockets continued movement of the carrier with the pressure plate 16 bearing against the neck of the bird, causes the legs of the bird to bend at the stifle joints, indicated at 46, and the thigh joints, indicated at 47. Movement of the carrier in a direction toward the leg engaging members is, of course, controllable through operation of foot pedal 42, and when the carrier has moved sufficiently far to have caused the legs of the turkey to assume their fully folded position against the ventral portion of the carcass, such as indicated in Fig. 2, an operator may stop further movement of the carrier by releasing his food from end 42a of pedal 42.

More particularly, when foot pressure is released from end 42a of the arm 42, valve spring 39 will urge the valve element 35 into seated position and simultaneously the end of valve stem 37 will urge arm 42 to its neutral or horizontal position. At that time air under pressure will be captured in airline 33 and cylinder 27 and movement of the carrier in a reverse direction away from the leg engaging members cannot be effected until the exhaust valve element 36 is actuated. After the carrier has been moved to the end of its pressure stroke or forwardmost position, as indicated in Fig. 1, wherein the legs of the bird have been pressed to fully folded or hunched position, an operator may then tie the legs together and secure this tie to the posterior part of the bird's carcass to prevent the legs from straightening out when the carrier is moved back to its retracted position and pressure on the legs is released. The specific manner of or means employed to tie the bird's legs together has not been indicated in the drawings as this step may be accomplished in any suitable and conventional way.

In view of the fact that leg receiving socket 25 is located slightly above socket 26, the legs of the turkey can be crossed during folding operations—i. e., the vertical displacement between the sockets approximately equals the thickness of one bird leg at the point where the other leg crosses it.

In order to exhaust captured air from cylinder 27 foot pressure may be applied to end 42b of arm 42 to cause end 42a of the arm to bias valve element 36 upwardly from its associated seat. As it has heretofore been indicated unseating of valve element 36 permits air captured in cylinder 27 to dissipate to atmosphere through airline 33 and exhaust port 45. Expansion springs 20 function to retract or move the carrier in a direction away from the leg engaging members as soon as air pressure in the cylinder is relieved, and rearward movement of the carrier due to the action of the spring, in turn, forces piston 29 back toward the head of the cylinder.

I have found when handling smaller birds, such as chickens and relatively small hen turkeys that it is desirable to provide a means for adjustably fixing the retracted position of the carrier closer to the leg engaging members than when larger birds are being handled. The reason for this preferred arrangement is that the carrier can operate in a shorter reciprocable stroke when handling smaller birds and greater convenience in handling of the birds is effected. To accomplish this end an angle iron, such as indicated at 50 in Fig. 7 or other suitable stop means may be provided to abut against the back of the carrier to limit maximum retraction thereof in a direction away from the leg engaging members. More specifically, angle iron 50 is shown as being provided with a pair of pins 52 adapted to removably engage any one of a plurality of pairs of apertures 51 provided along opposite edges of slot 12 of the table. In Fig. 2, angle iron 50 is shown in broken lines operatively positioned on the table, and it believed evident that when carrier B is retracted it will eventually strike against the angle iron and retractive movement of the carrier beyond element 50 will be prohibited. Manifestly if the angle iron 50 is positioned closer to the leg engaging members than shown in Fig. 2, the length of reciprocable stroke of the carrier will correspondingly be shortened.

It is believed evident from the foregoing description that the present invention affords a means to effectively fold the legs of a bird, such as an eviscerated turkey or chicken, to hunched positions against the ventral portion of the bird's carcass. Not only is use of the present invention extremely advantageous in that little human effort or strength is required to accomplish the leg folding operations, but it has been also found that pressure exerted lengthwise of the carcass of the bird during leg pressing operations actually shortens the overall length of the bird and makes the bird's body appear fatter or more plump. The effects that compression has upon the bird's body is indicated to some extent in the drawings wherein it is seen that the elongated neck portion of a bird (as it appears when the bird is first positioned on the carrier) is compressed tightly inwardly against the upper body portion of the bird during leg folding operations through its pressure contact with the pressure plate. I have found that when the carrier is retracted the bird does not have any considerable tendency to expand back to or resume its original more elongated shape. Partial deformity of a bird due to compressive action by the present device, as above described, makes for easier packaging of the bird because of the shortening of the overall length of the bird's body, and furthermore, it has been found that by making a bird's carcass appear shorter and plumper, that the sales attraction of a bird so processed is considerably enhanced.

Although I have described my invention in some detail by way of illustration and example for purposes of clarity of understanding, it is understood that certain changes and modifications may be made therein without departing from the spirit of the invention or scope of the appended claims.

I claim:
1. An apparatus for handling an eviscerated bird having rearwardly outstretched legs comprising, a carrier to support the carcass of said eviscerated bird, leg receiving means to receive the ends of the bird's rearwardly stretched legs which have been truncated adjacent the hock joints thereof, said carrier and leg receiving means supported for relative movement toward and away from one another, and driving means associated with at least one of the said foregoing named elements to cause forcible relative movement between said carrier and leg receiving means toward one another whereby the legs of the bird are moved toward the carcass and are bent at their stifle and thigh joints and folded to a hunched position against the carcass of the bird.

2. An apparatus according to claim 1 and wherein said leg receiving means comprises a pair of leg receiving sockets, and wherein each socket is arranged to receive respectively an end of a truncated bird leg therein.

3. An apparatus according to claim 1 wherein said leg receiving means comprises a pair of leg receiving sockets and wherein one said socket is disposed laterally to and slightly above the other said socket.

4. An apparatus according to claim 1 and wherein said carrier comprises a horizontal tray portion upon which the carcass of said bird is adapted to rest and an upwardly extending pressure plate adapted to bear against the bird to prevent displacement thereof from the tray during leg folding operations.

5. An apparatus for handling eviscerated birds according to claim 1 and wherein said carrier is mounted movably toward and away from said leg receiving means and wherein said driving means comprises a pneumatically actuated cylinder and piston having a piston rod connection with said carrier to drive the latter forcibly in a direction toward said leg receiving means.

6. In an apparatus for bending rearwardly outstretched legs of an eviscerated bird at the thigh and stifle joints thereof to fold them to a hunched position against the ventral portion of the bird's carcass, the combination comprising leg receiving members adapted to receive the ends of the legs of said eviscerated bird, a support member adapted to support the carcass of said bird with its rearwardly outstretched legs projecting toward said leg receiving members, said leg receiving members and said support member mounted relatively movably toward and away from one another, and driving means associated with at least one of the said foregoing named elements to cause forcible relative movement between said leg receiving members and said support member in a direction toward one another, whereby a compressive force is exerted axially of the bird's body and rearwardly outstretched legs to cause shortening of the bird's body and to cause the legs of the bird to bend at their respective thigh and stifle joints and to fold to a hunched position against the ventral portion of the bird's carcass.

7. An apparatus for handling an eviscerated bird having rearwardly outstretched legs, comprising a frame, leg receiving members attached stationary to said frame, a carrier supported pivotally to said frame for movement in a direction generally toward and away from said leg receiving members, said carrier having means to support an eviscerated bird thereon in a position whereat the rearwardly outstretched legs of the bird project toward said leg engaging members for engagement therewith, means to drive said carrier forcibly in a direction toward said leg receiving members, and means provided on said carrier to prevent displacement of the bird from said carrier when the latter is driven forcibly toward said leg receiving members to cause a compressive force to be exerted against said bird axially the bird's carcass and legs whereby said legs are bent at their thigh and stifle joints and are folded to a hunched position against the ventral portion of the carcass of the bird.

8. An apparatus according to claim 7 and wherein said leg receiving members comprise a pair of leg receiving sockets, and wherein one of said sockets located slightly above and laterally to the other socket.

9. An apparatus for handling eviscerated birds comprising a carrier adapted to support the carcass of an eviscerated bird thereon, leg receiving means adapted to receive the ends of the legs of an eviscerated bird, said carrier mounted reciprocably toward and away from said leg receiving means, and means to limit adjustably the maximum length of reciprocable stroke permitted between the carrier and said leg receiving means.

10. An apparatus for folding the legs of an eviscerated bird having rearwardly outstretched legs comprising; a carcass engaging member to engage the neck and shoulders of a bird, leg receiving means oppositely facing and spaced from said carcass engaging member adapted to receive the rearwardly extended leg ends of a bird, and driving means associated with at least one of the said foregoing named elements for causing forcible relative movement between said carcass engaging member and said leg receiving means, whereby the legs of a bird are moved toward the carcass and are bent at their stifle and thigh joints and folded to a hunched position against the carcass of the bird.

LELAND J. BELL.

REFERENCES CITED

The following references are of record in the file of this patent:

UNITED STATES PATENTS

| Number | Name | Date |
| --- | --- | --- |
| 1,611,268 | Colby | Dec. 12, 1926 |
| 1,788,991 | Dziedzic et al. | Jan. 13, 1931 |
| 1,975,916 | Bech | Oct. 9, 1934 |
| 2,229,862 | Menges | Jan. 28, 1941 |